(12) United States Patent
Okuda et al.

(10) Patent No.: US 10,146,114 B2
(45) Date of Patent: Dec. 4, 2018

(54) PROJECTION DISPLAY APPARATUS

(71) Applicant: Panasonic Intellectual Property Management Co., Ltd., Osaka (JP)

(72) Inventors: Michihiro Okuda, Osaka (JP); Manabu Okuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/497,195

(22) Filed: Apr. 25, 2017

(65) Prior Publication Data
US 2017/0357151 A1   Dec. 14, 2017

(30) Foreign Application Priority Data

Jun. 13, 2016 (JP) .................................. 2016-116748
Mar. 6, 2017 (JP) .................................. 2017-041775

(51) Int. Cl.
| G03B 35/22 | (2006.01) |
| G03B 21/20 | (2006.01) |
| G03B 33/12 | (2006.01) |
| G03B 33/08 | (2006.01) |
| H04N 9/31 | (2006.01) |

(52) U.S. Cl.
CPC ....... *G03B 21/2013* (2013.01); *G03B 21/204* (2013.01); *G03B 21/208* (2013.01); *G03B 33/08* (2013.01); *G03B 33/12* (2013.01); *G03B 21/2066* (2013.01); *H04N 9/3114* (2013.01); *H04N 9/3164* (2013.01)

(58) Field of Classification Search
CPC .... G03B 35/22; G03B 35/26; G03B 21/2053; G03B 21/2066; G02B 26/008; G02B 27/2207; G02B 27/2264
USPC ........................................................ 353/7, 31
See application file for complete search history.

(56) References Cited

U.S. PATENT DOCUMENTS

| 2014/0211169 A1* | 7/2014 | Kitano | ................. G03B 21/204 353/31 |
| 2014/0253882 A1* | 9/2014 | King | .................... G02B 26/008 353/31 |

(Continued)

FOREIGN PATENT DOCUMENTS

JP   2011-128521   6/2011

*Primary Examiner* — Steven H Whitesell Gordon
*Assistant Examiner* — Jerry Brooks
(74) *Attorney, Agent, or Firm* — McDermott Will & Emery LLP

(57) ABSTRACT

A projection display apparatus of the present disclosure includes a solid state light source discharging blue light in a first wavelength range; a wheel having a transmission part transmitting blue light and a first light-emitting body emitting light in response to irradiation with blue light; a second light-emitting body emitting light in a second wavelength range closer to the longer wavelengths than the first wavelength range is and adjacent to the first wavelength range, in response to irradiation with blue light that has passed through the transmission part; a light uniformizing element uniformizing the blue light and the light emitted from the first and second light-emitting body; a light modulation element modulating the light uniformized by the light uniformizing element; and projection unit projecting the light modulated by the light modulation element.

12 Claims, 8 Drawing Sheets

(56) References Cited

U.S. PATENT DOCUMENTS

2014/0375959 A1* 12/2014 Yang .................... G03B 21/204
　　　　　　　　　　　　　　　　　　　　353/31
2016/0105651 A1* 4/2016 Wang ................... H04N 9/3114
　　　　　　　　　　　　　　　　　　　　353/31

* cited by examiner (a)  (b)

(a)     (b)

(a)　　　　　　　　　(b)

PROJECTION DISPLAY APPARATUS

BACKGROUND

1. Technical Field

The present disclosure relates to a projection display apparatus using a light source device that includes a light source discharging blue excitation light and a light-emitting body emitting light in response to the excitation light.

2. Description of the Related Art

Patent literature 1 discloses a projector capable of projecting high-quality color images that includes a light source device with its distribution of the wavelength of source light in the blue wavelength band expanded, where the light source device includes a blue laser emitting device as an excitation light source, diffuses the light emitted from the excitation light source, and uses the diffused light as source light in the blue wavelength band.

CITATION LIST

Patent Literature

PTL 1: Japanese Patent Unexamined Publication No. 2011-128521

SUMMARY

The present disclosure provides a projection display apparatus capable of making the chromaticity of blue light proper.

A projection display apparatus of the present disclosure includes a solid state light source discharging blue light in a first wavelength range; a wheel having a transmission part transmitting blue light and a first light-emitting body emitting light in response to irradiation with blue light; a second light-emitting body emitting light in a second wavelength range closer to the longer wavelengths than the first wavelength range is and adjacent to the first wavelength range, in response to irradiation with blue light that has passed through the transmission part; a light uniformizing element uniformizing the blue light and the light emitted from the first and second light-emitting body; a light modulation element modulating the light uniformized by the light uniformizing element; and projection unit projecting the light modulated by the light modulation element.

The present disclosure improves the chromaticity of blue light displayed by a projection display apparatus.

DETAILED DESCRIPTION OF THE PREFERRED EMBODIMENTS

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the inventor provides accompanying drawings and the following description for those skilled in the art to well understand the disclosure and does not intend to limit the subjects described in the claims by the drawings and the description.

First Exemplary Embodiment
Projection Display Apparatus

Figure 1:
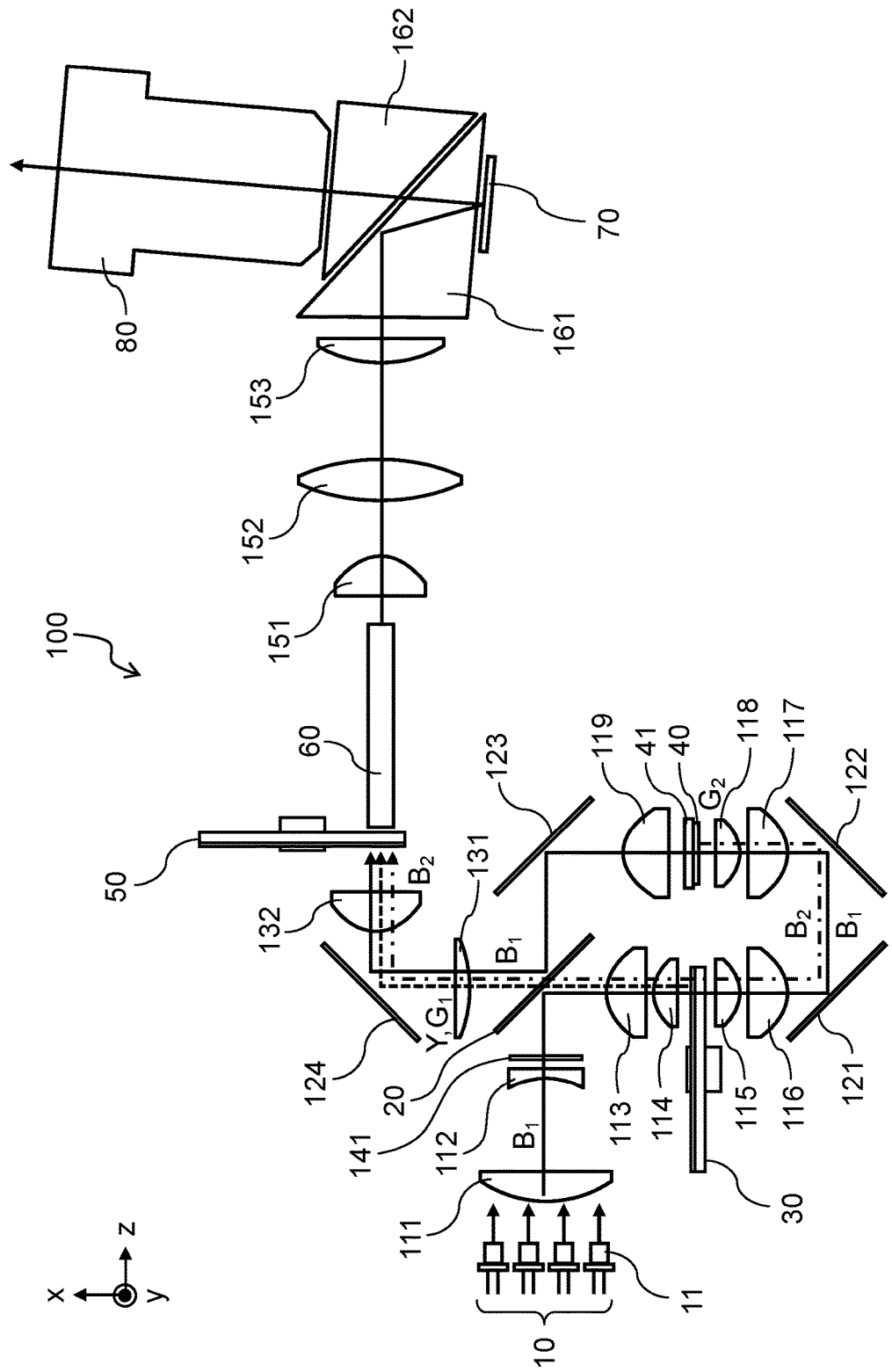
FIG. 1 illustrates a projection display apparatus according to the first embodiment.

Hereinafter, a description is made of the configuration of a projection display apparatus according to the first embodiment using FIGS. 1 through 6. FIG. 1 illustrates the optical configuration of projection display apparatus 100 according to the first embodiment. In the first embodiment, exemplification is made of a case where red component light R, green component light G, blue component light B (first blue component light $B_1$+second blue component light $B_2$), and yellow component light Y are used for image light.

As shown in FIG. 1, projection display apparatus 100 first includes light source unit 10, dichroic mirror 20, phosphor wheel 30, phosphor plate 40, color wheel 50, rod integrator 60, digital mirror device (DMD) 70, and projection unit 80.

Light source unit 10 is composed of multiple solid state light sources such as a laser diode (LD) and a light emitting diode (LED). In this embodiment, a laser diode, especially laser diode 11 that emits blue light, is used as a solid state light source.

Emitted light from light source unit 10 is blue light with a wavelength of 455 nm, and is used as image light (first blue component light $B_1$) as well as excitation light for exciting a phosphor. Here, the wavelength of emitted light from light source unit 10 is not limited to 455 nm, but it may be between 440 nm and 460 nm for example. The wavelength of this blue light is an example of the first wavelength range.

Blue light emitted from light source unit 10 passes through lens 111, lens 112, and diffusion plate 141, and enters dichroic mirror 20. Dichroic mirror 20 reflects first blue component light $B_1$ (excitation light). First blue component light $B_1$ reflected by dichroic mirror 20 is collected by lenses 113 and 114, and excites the phosphor of phosphor wheel 30 for emitting light.

Dichroic mirror 20 transmits yellow emission light Y and green emission light $G_1$ emitted from phosphor wheel 30.

Figure 2:
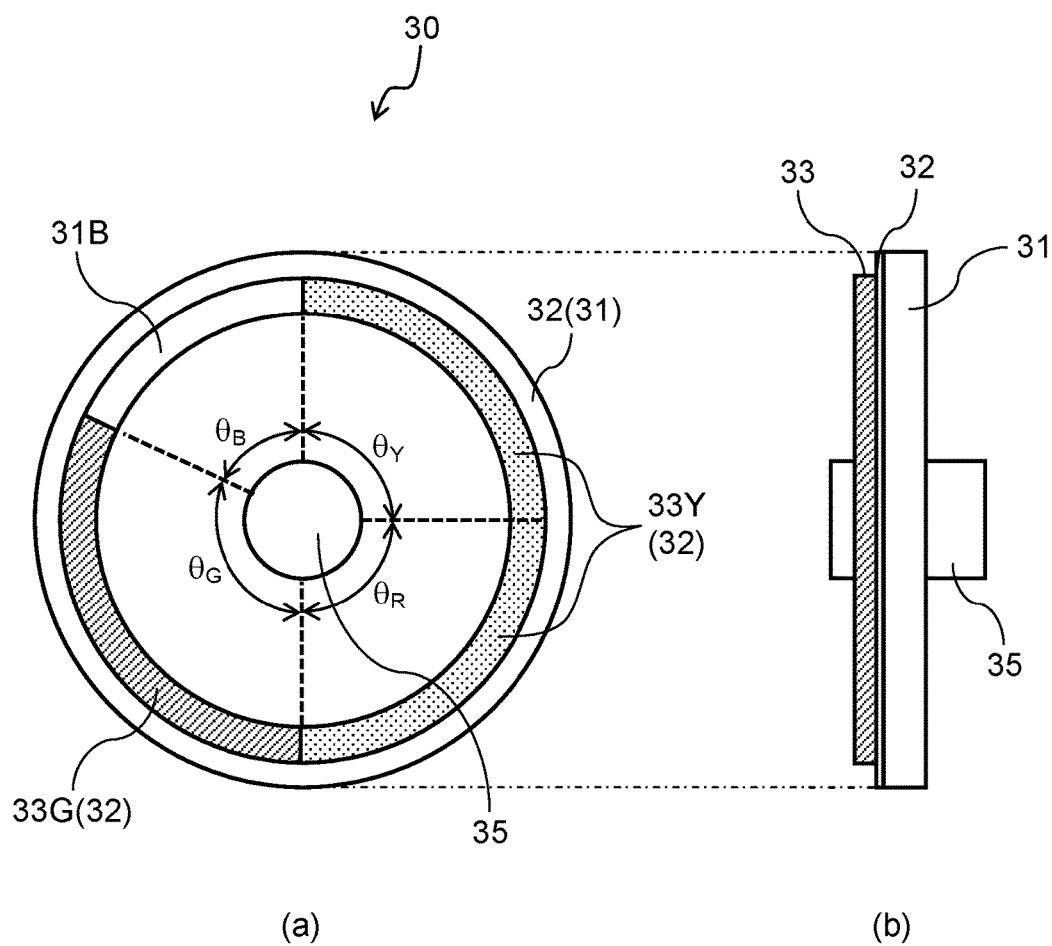
FIG. 2 illustrates a phosphor wheel according to the first embodiment.

As shown in FIG. 2, phosphor wheel 30 is composed of substrate 31, reflective coating 32 formed on substrate 31, phosphor coating 33 coated on reflective coating 32 in a ring shape, and motor 35 for rotating substrate 31. FIG. 2 (a)

illustrates the phosphor wheel viewed toward direction −x of FIG. 1. FIG. 2 (b) illustrates the phosphor wheel viewed toward direction z of FIG. 1.

Substrate 31 having opening 31B transmits excitation light. Phosphor coating 33 is composed of yellow phosphor coating 33Y and green phosphor coating 33G. In FIG. 2 (a) and FIG. 3 (a), a mark in parentheses indicates that a component of the mark without parentheses is positioned in the upper layer. In other words, FIG. 2 (a) shows that reflective coating 32 is disposed on substrate 31, and yellow phosphor coating 33Y and green phosphor coating 33G are positioned on reflective coating 32. Phosphor coating 33 is an example of the first light-emitting body, and phosphor wheel 30 is an example of the wheel.

Phosphor coating 33 can be produced by the following process for example. That is, a powder ceramic phosphor is mixed into an adhesive agent (silicone resin), which is coated onto a substrate, and then hardened at a high temperature. Examples of a ceramic phosphor used for phosphor coating 33 include YAG phosphor and LAG phosphor, each of which is a cerium-activated garnet structure phosphor.

As shown in FIG. 2 (a), phosphor wheel 30 is circumferentially composed of four segments. First segment (angle region $\theta_R$) is a region for generating red component light R; second segment (angle region $\theta_G$), for green component light G; third segment (angle region $\theta_B$), for blue component light B; and fourth segment (angle region $\theta_Y$), for yellow component light Y.

Yellow phosphor coating 33Y includes phosphor Y that emits yellow emission light Y in response to first blue component light $B_1$ (excitation light) emitted from light source unit 10. Yellow phosphor coating 33Y is formed in the fourth segment and the first segment (given angle region $\theta_Y+\theta_R$) in the ring-shaped region where phosphor coating 33 is formed. Here, yellow phosphor coating 33Y is a region irradiated with first blue component light $B_1$ (excitation light) while phosphor wheel 30 is rotating. In other words, first blue component light $B_1$ is collected onto yellow phosphor coating 33Y by lens 114.

Green phosphor coating 33G has phosphor $G_1$ that emits green emission light $G_1$ in response to first blue component light $B_1$ (excitation light) emitted from light source unit 10. Green phosphor coating 33G is formed in the second segment (given angle region $\theta_G$) in the ring-shaped region where phosphor coating 33 is formed. Here, green phosphor coating 33G is a region irradiated with first blue component light B1 (excitation light) while phosphor wheel 30 is rotating. In other words, first blue component light $B_1$ is collected on green phosphor coating 33G by lens 114.

Opening 31B is a substrate open region that transmits first blue component light $B_1$. Opening 31B is formed in given angle region $\theta_B$. Opening 31B is an example of the transmission part.

In this way, yellow emission light Y, green emission light $G_1$, and first blue component light $B_1$ are emitted in a time-division manner according to rotation of phosphor wheel 30. It should be noted, however, that yellow emission light Y and green emission light $G_1$ are reflected and first blue component light $B_1$ is transmitted.

Referring back to FIG. 1, first blue component light $B_1$ that has passed through opening 31B of phosphor wheel 30 is collimated by lenses 115 and 116, reflected by mirrors 121 and 122; and is collected by lenses 117 and 118 to enter phosphor plate 40. Here, mirror 122 is a dichroic mirror that reflects only first blue component light $B_1$ and second blue component light $B_2$ (described later).

Figure 3:
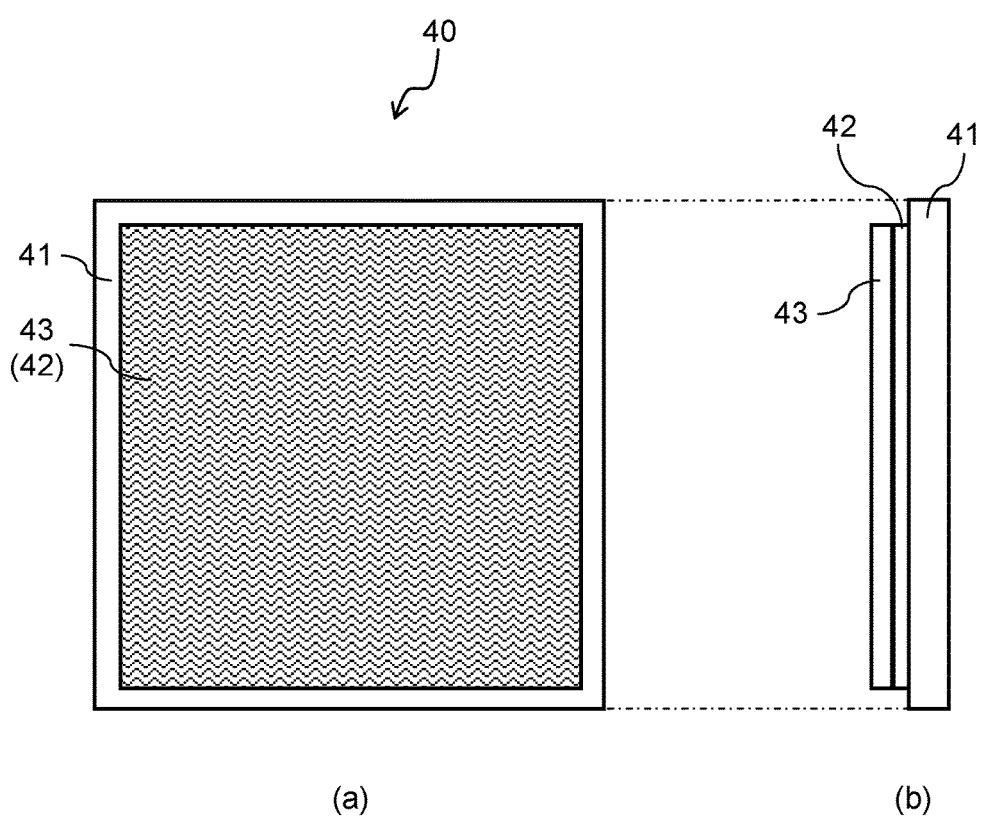
FIG. 3 illustrates a phosphor plate according to the first embodiment.

As shown in the plan view of FIG. 3 (a) and the side view of FIG. 3 (b), phosphor plate 40 is composed of light-transmissive substrate 41, dichroic coating 42, and phosphor coating 43. Light-transmissive substrate 41 can be made of glass or sapphire for example. Dichroic coating 42 has spectral characteristics in which it transmits blue light (430 nm to 470 nm) and reflects light in a wavelength range of 471 nm to 680 nm.

Phosphor coating 43 is made of light phosphor $G_2$ that emits green emission light $G_2$ in a wavelength band of 460 nm to 750 nm. Here, phosphor $G_2$ used for phosphor coating 43 is identical to phosphor $G_1$ used for green phosphor coating 33G of phosphor wheel 30. However, to efficiently extract light with a wavelength of 471 nm to 680 nm, another different phosphor can be used. In phosphor coating 43, its coating thickness and phosphor concentration are adjusted so as to absorb only part of incoming blue light to emit light and to transmit the rest. More specifically, phosphor coating 43 is adjusted so as to absorb 10% to 60% of the incoming blue light and to transmit the remaining blue light. Phosphor coating 43 is an example of the second light-emitting body, and the wavelength range of 460 nm to 750 nm of light emitted from phosphor coating 43 is an example of the second wavelength range.

Light emitted from phosphor coating 43 is emitted in the direction opposite to the incident direction of first blue component light $B_1$ due to dichroic coating 42. First blue component light $B_1$ that has not been absorbed by phosphor coating 43 passes through dichroic coating 42.

Referring back to FIG. 1, yellow emission light Y and green emission light $G_1$, which are light (indicated by the dotted line in FIG. 1) emitted from phosphor wheel 30, passes through dichroic mirror 20, passes through lens 131, reflected by mirror 124 with its optical path changed by 90°, and passes through lens 132 to enter color wheel 50.

Meanwhile, first blue component light $B_1$ (indicated by the solid line in FIG. 1) that has passed through phosphor wheel 30 enters phosphor plate 40. As described above, first blue component light $B_1$ either is absorbed by or passes through phosphor plate 40, and thus only second blue component light $B_2$ of green emission light $G_2$ emitted from phosphor plate 40 reflected by mirror 122 (a dichroic mirror). Here, the wavelength range of 460 nm to 560 nm of second blue component light $B_2$ with its dominant wavelength 515 nm is an example of the third wavelength range. Second blue component light B2 passes through opening 31B of phosphor wheel 30 and through dichroic mirror 20. Second blue component light $B_2$ travels along the optical path indicated by the dot-dash line in FIG. 1.

Meanwhile, first blue component light $B_1$ (indicated by the solid line in FIG. 1) that has passed through phosphor plate 40 passes through lens 119 and reflected by mirror 123 and dichroic mirror 20. At this moment, first blue component light $B_1$ having passed through phosphor plate 40 and second blue component light $B_2$ extracted from emission light $G_2$ of phosphor plate 40 are combined by dichroic mirror 20, pass through lens 131, are reflected by mirror 124, and pass through lens 132 to enter color wheel 50. As a result, yellow emission light Y containing red component light R and yellow component light Y, green emission light $G_1$ containing green component light G, and first blue component light $B_1$ and second blue component light $B_2$ composing blue component light B are emitted in a time-division manner according to rotation of phosphor wheel 30.

In this way, the chromaticity of blue component light B as image light becomes the chromaticity of first blue component light $B_1$ and second blue component light $B_2$ combined with each other, where mixing second blue component light $B_2$ into first blue component light $B_1$ with a dominant wavelength of 455 nm allows the chromaticity to be adjusted to an optimum blue chromaticity.

In this embodiment, the dominant wavelength of second blue component light $B_2$ is 515 nm, but not limited to it. It is desirable that phosphor $G_2$ is selected and the spectral characteristics of mirror 122 (a dichroic mirror) is designed so that the dominant wavelength of second blue component light $B_2$ falls between 470 nm and 530 nm.

Here, the positional relationship between phosphor wheel 30 and phosphor plate 40 is approximately conjugate. Thus, the light source image of first blue component light $B_1$ emitted from phosphor wheel 30, at the position of phosphor wheel 30 is transcribed onto phosphor plate 40. The light source image of green emission light $G_2$ from phosphor plate 40, at the position of phosphor plate 40 is transcribed onto phosphor wheel 30.

Figure 4:
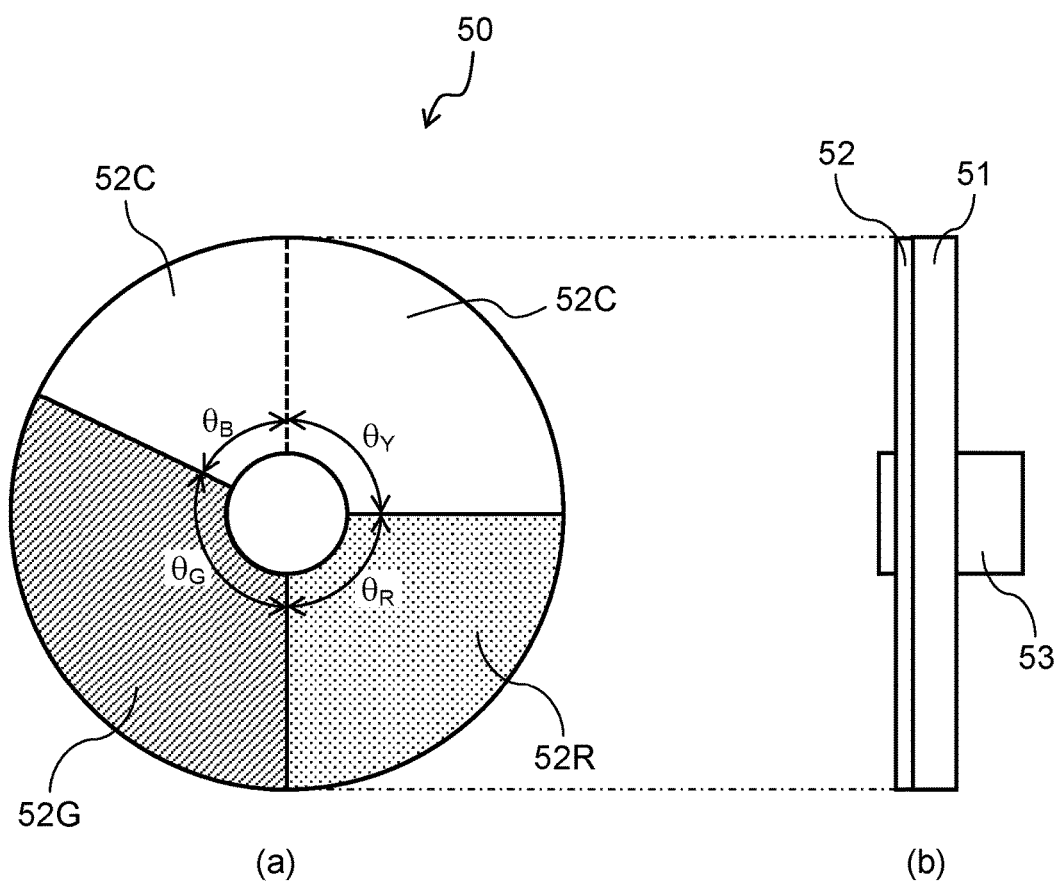
FIG. 4 illustrates a color wheel according to the first embodiment.

As shown in FIG. 4, color wheel 50 is composed of transparent substrate 51, dielectric multilayer coating 52 formed on substrate 51, and motor 53 for rotating substrate 51. FIG. 4 (a) illustrates the color wheel viewed toward direction z of FIG. 1. FIG. 4 (b) illustrates the color wheel viewed toward direction –y of FIG. 1.

Dielectric multilayer coating 52 is composed of red-transmissive dichroic coating 52R formed in given angle region $\theta_R$ (the first segment), green-transmissive dichroic coating 52G formed in given angle region $\theta_G$ (the second segment), and antireflection coating 52C formed in given angle region $\theta_B$ (the third segment) and in given angle region $\theta_Y$ (fourth segment). Color wheel 50 is controlled to rotate synchronously with phosphor wheel 30.

More specifically, while light is entering angle region $\theta_R$ of phosphor wheel 30, light is entering angle region $\theta_R$ of color wheel 50. While light is entering angle region $\theta_G$ of phosphor wheel 30, light is entering angle region $\theta_G$ of color wheel 50; angle region $\theta_B$ of phosphor wheel 30, angle region $\theta_B$ of color wheel 50; and angle region $\theta_Y$ of phosphor wheel 30, angle region $\theta_Y$ of color wheel 50. In this way, light generated in angle regions $\theta_R$, $\theta_G$, $\theta_B$, and $\theta_Y$ by means of phosphor wheel 30 and color wheel 50 is emitted in a time division manner. That is, phosphor wheel 30 and color wheel 50 generate light of color components including red component light R, green component light G, blue component light B, and yellow component light Y, and emit the light in a time-division manner.

Figure 5A:
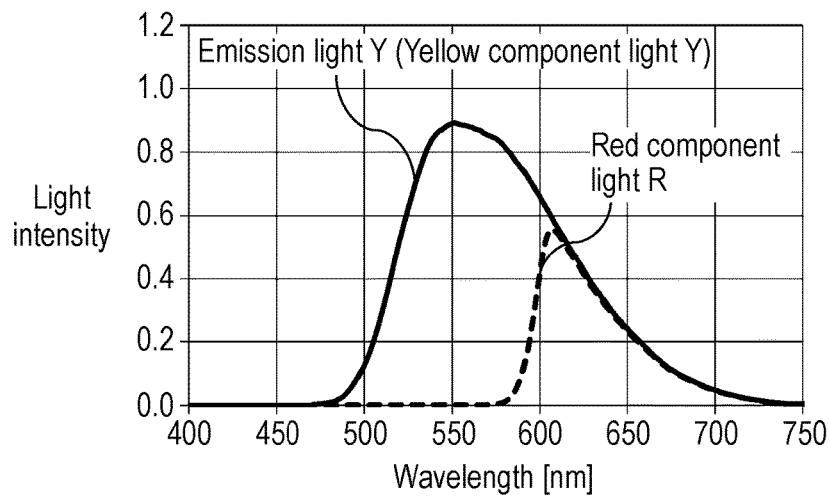
FIG. 5A is a spectrum of yellow component light in a projection display apparatus according to the first embodiment.

Hereinafter, a description is made of color generation in the respective angle regions (segments) referring to each spectrum shown in FIGS. 5A through 5C. In angle region $\theta_R$, yellow emission light Y (the solid line in FIG. 5A) is emitted from yellow phosphor coating 33Y of phosphor wheel 30 and passes through red-transmissive dichroic coating 52R of color wheel 50 to become red component light R (the broken line in FIG. 5A). Adjusting the spectral characteristics of red-transmissive dichroic coating 52R of color wheel 50 allows the color purity of red component light R to be controlled.

Figure 5B:
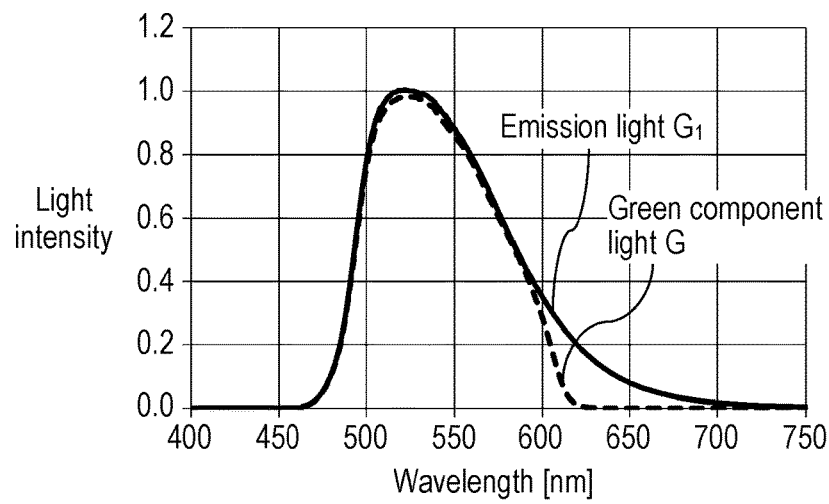
FIG. 5B is a spectrum of green component light in the projection display apparatus according to the first embodiment.
Figure 5C:
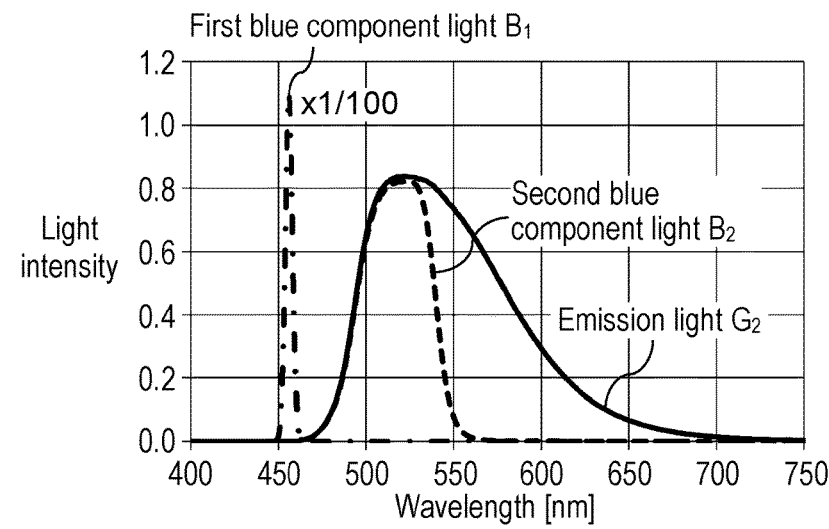
FIG. 5C is a spectrum of blue component light in the projection display apparatus according to the first embodiment.

In angle region $\theta_G$, green emission light $G_1$ (the solid line in FIG. 5B) is emitted from green phosphor coating 33G of phosphor wheel 30, and then passes through green-transmissive dichroic coating 52G of color wheel 50 to become green component light G (the broken line in FIG. 5B). Adjusting the spectral characteristics of green-transmissive dichroic coating 52G of color wheel 50 allows the color purity of green component light G to be controlled. In angle region $\theta_B$, first blue component light $B_1$ that has passed through opening 31B of phosphor wheel 30 enters phosphor plate 40. First blue component light $B_1$ (the dot-dash line in FIG. 5C) that has passed through phosphor plate 40 passes through antireflection coating 52C of color wheel 50. Meanwhile, emission light $G_2$ (the solid line in FIG. 5C) emitted from phosphor plate 40 becomes second blue component light $B_2$ (the broken line in FIG. 5C) through mirror 122, passes through opening 31B again, and then passes through antireflection coating 52C of color wheel 50. First blue component light $B_1$ and second blue component light $B_2$ pass through antireflection coating 52C of color wheel 50, which causes color change at a negligible level. In FIG. 5C, first blue component light $B_1$ is represented with a scale of 1/100.

In angle region $\theta_Y$, yellow emission light Y is emitted from yellow phosphor coating 33Y of phosphor wheel 30, and passes through antireflection coating 52C of color wheel 50 to become yellow component light Y. Yellow emission light Y passes through antireflection coating 52C of color wheel 50, which causes color change at a negligible level.

Referring back to FIG. 1, light emitted from color wheel 50 enters rod integrator 60. Rod integrator 60 is a solid rod made of a transparent component such as glass. Rod integrator 60 uniformizes light emitted from light source unit 10 and from phosphor wheel 30. Here, rod integrator 60 may be a hollow rod with its inner wall made of a mirror surface. Rod integrator 60 is an example of a light uniformizing element.

Light emitted from rod integrator 60 passes through lenses 151, 152, and 153, enters a total reflection prism composed of triangular prisms 161 and 162, and then enters DMD 70.

DMD 70 modulates each color component light generated by light source unit 10, phosphor wheel 30, and color wheel 50, in a time-division manner. Minutely, DMD 70 is composed of multiple minute mirrors, which are movable. Each minute mirror basically corresponds to one pixel. DMD 70 changes the angle of each minute mirror according to an image signal (modulation) to change whether or not DMD 70 reflects light toward projection unit 80.

DMD 70 expresses gradation of each color correspondingly to angle regions $\theta_R$, $\theta_G$, $\theta_B$, and $\theta_Y$ described in FIGS. 2 and 4. Specifically, while angle region $\theta_R$ is being irradiated with light, DMD 70 modulates red component light R (image light). While angle region $\theta_G$ is being irradiated with light, DMD 70 modulates green component light G (image light); angle region $\theta_B$, blue component light B (image light); and angle region $\theta_Y$, yellow component light Y (image light). DMD 70 is an example of a light modulation element.

Image light generated by DMD 70 modulating passes through triangular prisms 161 and 162 and enters projection unit 80. Image light that has entered projection unit 80 is projected on a screen (not shown) in an enlarged view.

Figure 6:
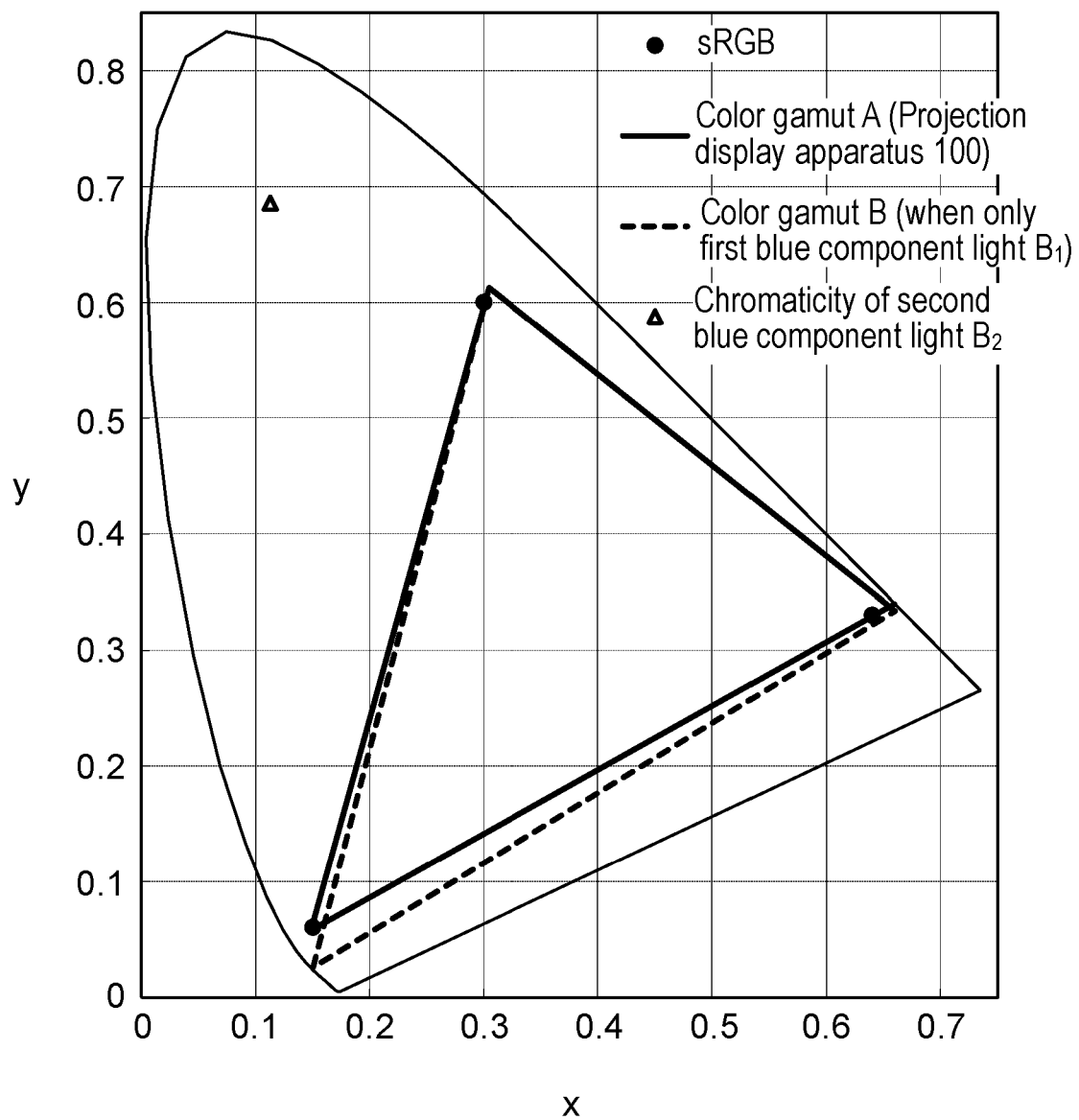
FIG. 6 is a chromaticity diagram for illustrating advantages of the first embodiment.

FIG. 6, a chromaticity diagram, indicates that color gamut A of projection display apparatus 100 according to this embodiment includes sRGB (only each color point is shown in FIG. 6). The chromaticity of second blue component light $B_2$ is indicated by the triangle in FIG. 6. Second blue component light $B_2$ is mixed with first blue component light $B_1$ to normalize the blue chromaticity.

Meanwhile, when only first blue component light $B_1$ is used as image light (phosphor plate 40 is not used), color gamut B proves to have a region not including sRGB.

Effects and Advantages

In the first embodiment, using phosphor plate 40 allows second blue component light $B_2$ to be mixed into first blue component light $B_1$, which provides a color gamut that includes sRGB that first blue component light $B_1$ cannot include.

Second Exemplary Embodiment

Hereinafter, a description is made of the second exemplary embodiment using FIGS. 7 and 8, mainly of differences from the first embodiment.

Figure 7:
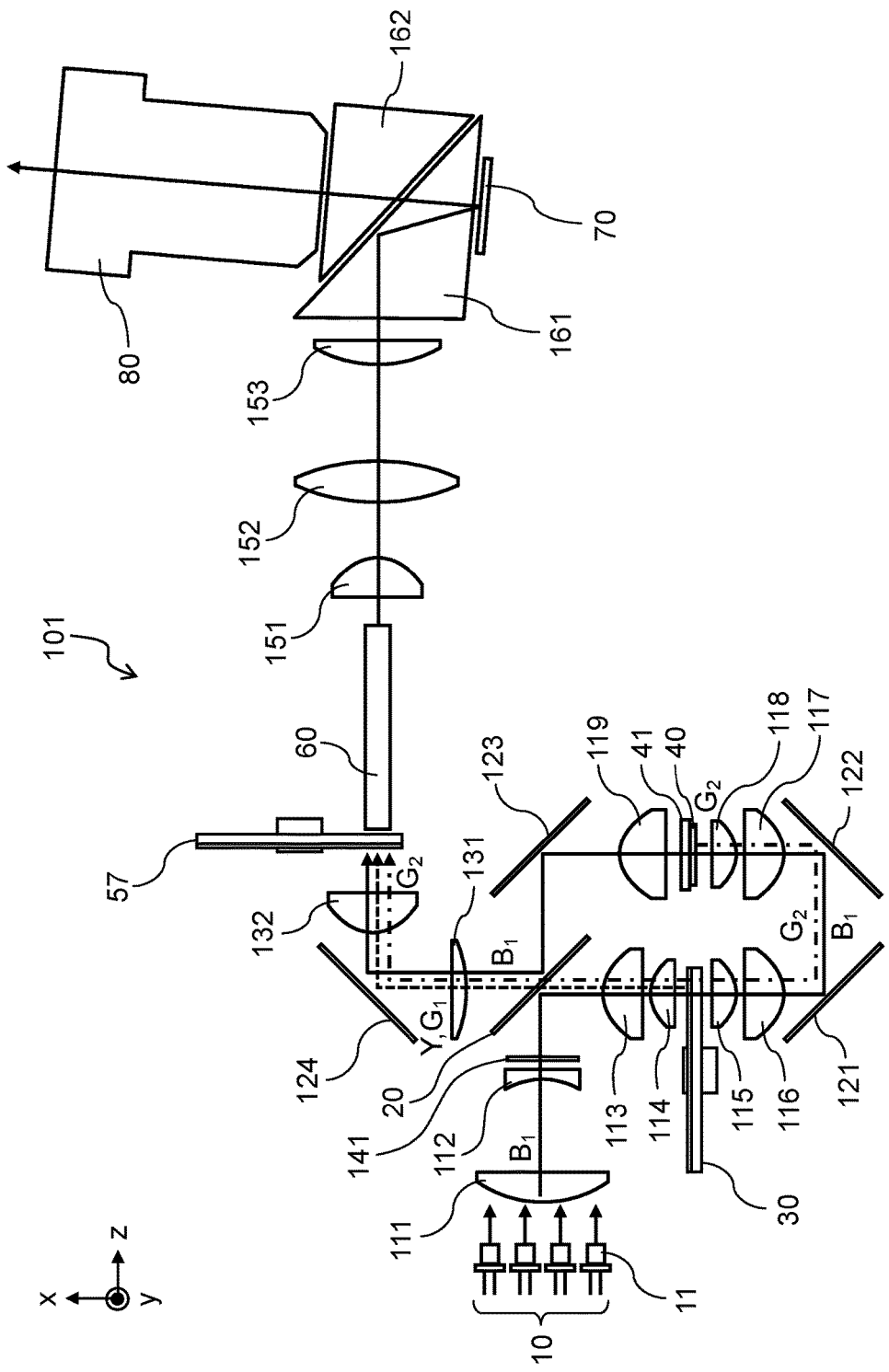
FIG. 7 illustrates a projection display apparatus according to the second embodiment.
Figure 8:
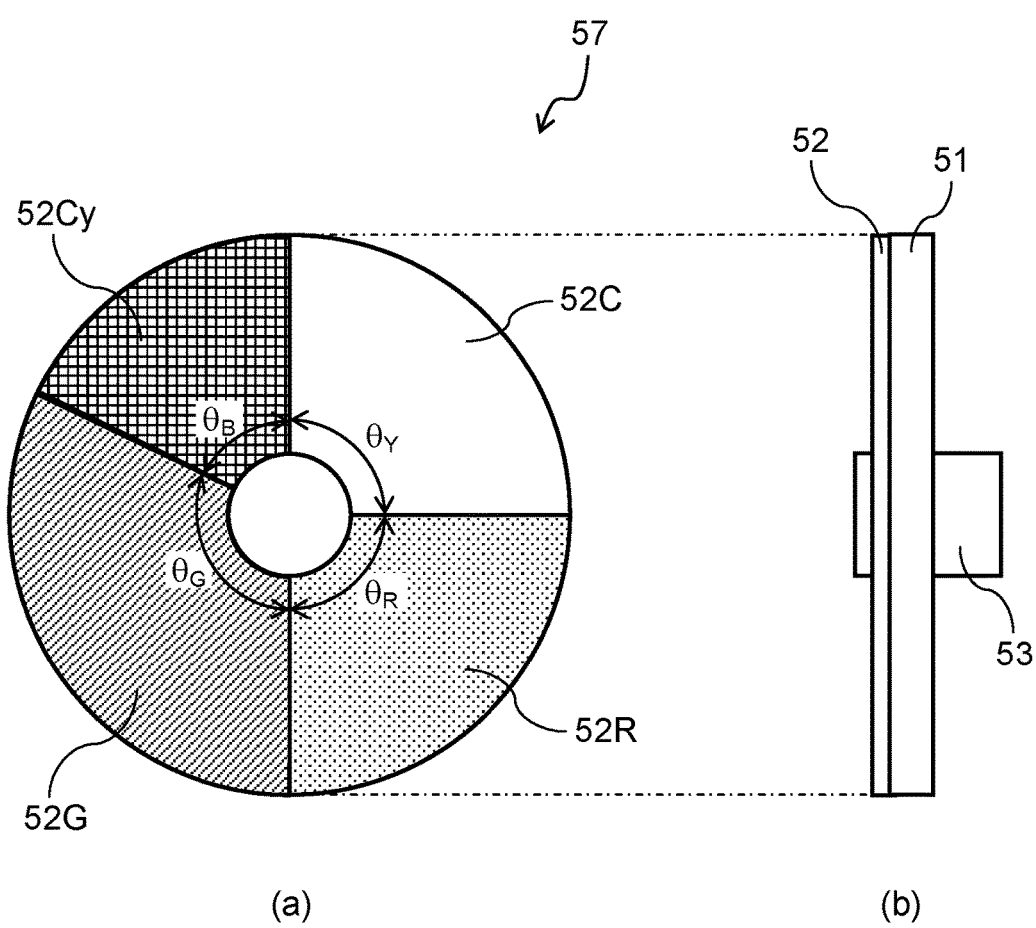
FIG. 8 illustrates a color wheel according to the second embodiment.

FIG. 7 illustrates projection display apparatus 101 according to the second embodiment. FIG. 8 shows color wheel 57 used in the second embodiment, which is used instead of color wheel 50 (FIG. 4) of projection display apparatus 100 (FIG. 1) described in the first embodiment. Dielectric multilayer coating 52 of color wheel 57 is composed of red-transmissive dichroic coating 52R formed in given angle region $\theta_R$, green-transmissive dichroic coating 52G formed in given angle region $\theta_G$, cyan-transmissive dichroic coating 52Cy formed in given angle region $\theta_B$, and antireflection coating 52C formed in given angle region $\theta_Y$. That is, the second embodiment is different from the first in that cyan-transmissive dichroic coating 52Cy is formed in angle region $\theta_B$.

In the first embodiment, mirror 122 shown in FIG. 1 is described as a dichroic mirror; in the second embodiment, a total reflection mirror is used. In this case, reflection of mirror 122 (a total reflection mirror) changes the spectrum (chromaticity) at a negligible level.

In the first embodiment, mirror 122 (a dichroic mirror) extracts second blue component light $B_2$ from green emission light $G_2$ emitted from phosphor plate 40. In the second embodiment, cyan-transmissive dichroic coating 52Cy provided in the third segment of color wheel 50 extracts second blue component light $B_2$. As shown in FIG. 7, green emission light $G_2$ emitted from phosphor plate 40 reflected by mirror 122 (a total reflection mirror) and mirror 121, passes through opening 31B of phosphor wheel 30 and through dichroic mirror 20, and reflected by mirror 124 to enter angle region $\theta_B$ of color wheel 57. Cyan-transmissive dichroic coating 52Cy extracts second blue component light $B_2$ from green emission light $G_2$ that has entered color wheel 57, and only second blue component light $B_2$ of green emission light $G_2$ passes through color wheel 57. Here, this cyan-transmissive dichroic coating 52Cy extracts second blue component light $B_2$ while transmitting first blue component light $B_1$.

Second blue component light $B_2$ emitted from color wheel 57, together with first blue component light $B_1$, composes blue component light B, which enters rod integrator 60 to be uniformized.

Other Exemplary Embodiments

Hereinbefore, the first and second embodiments are described to exemplify the technology disclosed in this application. The technology of the disclosure, however, is not limited to these embodiments, but is applicable to other embodiments appropriately devised through modification, substitution, addition, and omission for example. Further, some components described in the first and second embodiments can be combined to devise a new embodiment. Hence, other exemplary embodiments are exemplified hereinafter.

In the first and second embodiments, DMD 70 is exemplified as a light modulation element, but an embodiment is not limited to DMD 70. The light modulation element may be a single liquid crystal display panel or may be composed of three panels (red, green, and blue liquid crystal display panels). The liquid crystal display panel may be either transmissive or reflective.

In the first and second embodiments, a phosphor wheel is exemplified as a phosphor generating emission light, but an embodiment is not limited to a phosphor wheel. The phosphor may be a static inorganic phosphor ceramic. The above-described embodiments are for exemplification of the technologies in the disclosure. Hence, the embodiments may undergo various kinds of change, substitution, addition, and/or omission within the scope of the claims and their equivalent technology.

INDUSTRIAL APPLICABILITY

The present disclosure is applicable to a projection display apparatus such as a projector.

What is claimed is:

1. A projection display apparatus comprising:
   a solid state light source discharging blue light in a first wavelength range;
   a wheel having a transmission part transmitting the blue light and a first light-emitting body emitting emission light in response to irradiation with the blue light;
   a second light-emitting body emitting emission light in a second wavelength range closer to longer wavelengths than the first wavelength range is and adjacent to the first wavelength range, in response to irradiation with the blue light that has passed through the transmission part;
   a light uniformizing element uniformizing the blue light and the emission light from the first and second light-emitting bodies;
   a light modulation element modulating light uniformized by the light uniformizing element; and
   a projection unit projecting the light modulated by the light modulation element,
   wherein the second light-emitting body is placed at a position conjugate to the wheel.

2. The projection display apparatus of claim 1,
   wherein the second light-emitting body absorbs 10% to 60% of the blue light.

3. The projection display apparatus of claim 1,
   wherein the emission light in the second wavelength range contains light in a third wavelength range adjacent to the first wavelength range, and
   wherein the projection display apparatus comprises a dichroic mirror that extracts the light in the third wavelength range, contained in the emission light from the second light-emitting body, in an optical path between the first light-emitting body and the second light-emitting body.

4. The projection display apparatus of claim 1, further comprising a color wheel that the blue light and the emission light from the first light-emitting body and the second light-emitting body enter,
   wherein the emission light in the second wavelength range contains light in a third wavelength range adjacent to the first wavelength range, and
   wherein a given segment of the color wheel that the blue light and the emission light from the second light-emitting body enter transmits the blue light and the light in the third wavelength range.

5. The projection display apparatus of claim 1, further comprising a color wheel that the blue light and the emission light from the first light-emitting body and the second light-emitting body enter,
   wherein the emission light in the second wavelength range contains light in a third wavelength range adjacent to the first wavelength range, and wherein the color wheel includes a dichroic coating that extracts the light in the third wavelength range, contained in the emission light from the second light-emitting body.

6. The projection display apparatus of claim 3, wherein a dominant wavelength of the light in the third wavelength range falls within a range of 470 nm to 530 nm.

7. The projection display apparatus of claim 4, wherein a dominant wavelength of the light in the third wavelength range falls within a range of 470 nm to 530 nm.

8. The projection display apparatus of claim 5, wherein a dominant wavelength of the light in the third wavelength range falls within a range of 470 nm to 530 nm.

9. The projection display apparatus of claim 3,
wherein the wheel emits light of color components including at least red component light, green component light, and blue component light in a time-division manner, and
wherein the blue component light is composed of the light in the first wavelength range and the light in the third wavelength range.

10. The projection display apparatus of claim 4,
wherein the wheel emits light of color components including at least red component light, green component light, and blue component light in a time-division manner, and
wherein the blue component light is composed of the light in the first wavelength range and the light in the third wavelength range.

11. The projection display apparatus of claim 5,
wherein the wheel emits light of color components including at least red component light, green component light, and blue component light in a time-division manner, and
wherein the blue component light is composed of the light in the first wavelength range and the light in the third wavelength range.

12. The projection display apparatus of claim 1,
wherein the second light-emitting body is arranged on a dichroic element that transmits the first wavelength range contain light and reflects the second wavelength range contain light, and
wherein the dichroic element is placed at a position where a light transmitting from the transmission part reflected by a mirror is incident.

\* \* \* \* \*